(12) United States Patent (10) Patent No.: US 7,377,119 B2
Kim et al. (45) Date of Patent: May 27, 2008

(54) AIR CONDITIONING SYSTEM AND CONTROL METHOD THEREOF

(75) Inventors: Seung-chul Kim, Seoul (KR); Hyeong-joon Seo, Suwon-si (KR); Jun-pyo Lee, Yongin-si (KR); Jae-hyo Jeong, Suwon-si (KR); Jung-chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 11/165,240

(22) Filed: Jun. 24, 2005

(65) Prior Publication Data

US 2006/0032254 A1 Feb. 16, 2006

(30) Foreign Application Priority Data

Aug. 11, 2004 (KR) ...................... 10-2004-0063180

(51) Int. Cl.
*F25B 13/00* (2006.01)
*F25B 41/00* (2006.01)
(52) U.S. Cl. .......................................... 62/160; 62/197
(58) Field of Classification Search ................. 62/197, 62/196.4, 160
See application file for complete search history.

(56) References Cited

U.S. PATENT DOCUMENTS 6,327,868 B1 * 12/2001 Furuya et al. ................ 62/197

(Continued)

FOREIGN PATENT DOCUMENTS

CN 2171079 Y 7/1994

(Continued)

OTHER PUBLICATIONS

The First Office Action issued on Oct. 13, 2006 by the State Intellectual Property Office of People's Republic of China in Application No. 200510083630.0 (7 pages) (8 pages of English translation).

(Continued)

*Primary Examiner*—Marc Norman
(74) *Attorney, Agent, or Firm*—Staas & Halsey LLP

(57) ABSTRACT

An air conditioning system includes an indoor heat exchanging unit, an outdoor heat exchanging unit, a compressor forming a closed loop together with the indoor and outdoor heat exchanging units to compress refrigerant, and a compressor driver to drive the compressor. The air conditioning system also includes an outdoor temperature sensor to sense outdoor temperature, a high pressure sensor to sense a pressure of the refrigerant discharged from the compressor, a low pressure sensor to sense the pressure of the refrigerant introduced into the compressor, a bypass pipe to connect a refrigerant pipe disposed between the indoor heat and outdoor heat exchanging units with a refrigerant pipe disposed in an influx part of the compressor, a bypass valve to open and close the bypass pipe, and a controller to open the bypass valve when the pressure sensed by the low pressure sensor is a predetermined target low pressure or is below the predetermined target low pressure, and to close the bypass valve when the pressure sensed by the high pressure sensor is over a predetermined target high pressure, under a condition in which the outdoor temperature sensed by the outdoor temperature sensor is a predetermined reference temperature or is below the predetermined reference temperature during a heating operation. Thus, the air conditioning system and a control method thereof, is improved in heating effect while performing a heating operation under a condition in which the outdoor temperature is low.

18 Claims, 5 Drawing Sheets

U.S. PATENT DOCUMENTS 6,467,288 B2 * 10/2002 Kuroki et al. ................ 62/197
2004/0000399 A1    1/2004 Gavula

FOREIGN PATENT DOCUMENTS

| EP | 0 448 345 A1 | 9/1991 |
| --- | --- | --- |
| EP | 1 288 593 A2 | 3/2003 |
| EP | 1 371 914 A1 | 12/2003 |
| JP | 4-006372 | 1/1992 |
| JP | 4-110573 | 4/1992 |
| JP | 5-52445 | 3/1993 |
| JP | 08-313076 | 11/1996 |
| KR | 1987-2601 | 3/1987 |
| KR | 1990-5130 | 4/1990 |
| KR | 2002-13084 | 2/2002 |
| KR | 2003-15400 | 2/2003 |
| KR | 2003-40826 | 5/2003 |

OTHER PUBLICATIONS

Extended European Search Report Communication issued on Nov. 28, 2007 by the European Patent Office in the corresponding European Application No. 05107298.1-2301 (6 pages).

* cited by examiner

------- HEATING OPERATION
———— COOLING OPERATION

AIR CONDITIONING SYSTEM AND CONTROL METHOD THEREOF

CROSS-REFERENCE TO RELATED APPLICATIONS

This application claims the benefit of Korean Patent Application No. 2004-0063180, filed on Aug. 11, 2004, in the Korean Intellectual Property Office, the disclosure of which is incorporated herein by reference.

BACKGROUND OF THE INVENTION

1. Field of the Invention

The present invention relates to an air conditioning system and a control method thereof, and more particularly, to an air conditioning system and a control method thereof, which is improved in a heating effect while performing a heating operation under a condition in which an outdoor temperature is low.

2. Description of the Related Art

An air conditioning system employs a refrigerating cycle to condition state quantity such as room temperature and humidity of a residential building or an official building. That is, the air conditioning system repeats compression, condensation, expansion and evaporation of refrigerant, so that heating is achieved by heat radiation due to the condensation in winter, and cooling is achieved by heat absorption due to the evaporation.

One type of air conditioning system is a gas engine-driven heat pump (GHP) type air conditioning system, which uses driving force of a gas engine to drive a compressor, and recovers waste heat of the gas engine. The GHP type air conditioning system substitutes for an electric motor-driven heat pump (EHP) type air conditioning system. In the EHP type air conditioning system, there exists a problem of a disequilibrium between demand and supply of electric power according to a cooling demand increase in summer.

A conventional air conditioning system has the following problems while performing a heating operation under the condition that outdoor temperature is low.

First, when heating is performed at a low outdoor temperature, pressure of the refrigerant discharged from the compressor (i.e., a high pressure part) and pressure of the refrigerant introduced into the compressor (i.e., a low pressure part) are all low even though the gas engine is rotated at a maximum speed. This means that an amount of the circulated refrigerant is small, which causes a heating effect of the air conditioning system to be lowered.

Second, in the conventional air conditioning system, the heating effect depends on adjustment of an outdoor expansion valve. Therefore, the heating effect has a limit when the outdoor temperature is low. In the case of the GHP type air conditioning system, the heating effect may be adjusted by controlling a cooling water valve to adjust cooling water heated by waste heat of the gas engine. The allowable adjustment is limited.

SUMMARY OF THE INVENTION

Accordingly, it is an aspect of the present invention to provide an air conditioning system and a control method thereof, which is improved in heating effect while performing a heating operation under a condition in which an outdoor temperature is low.

Additional aspects and/or advantages of the invention will be set forth in part in the description which follows and, in part, will be obvious from the description, or may be learned by practice of the invention.

The foregoing and/or other aspects of the present invention are also achieved by providing an air conditioning system including an indoor heat exchanging unit, an outdoor heat exchanging unit, a compressor forming a closed loop together with the indoor and outdoor heat exchanging units, to compress a refrigerant, and a compressor driver to drive the compressor. The air conditioning system further includes an outdoor temperature sensor to sense outdoor temperature, a high pressure sensor to sense pressure of the refrigerant discharged from the compressor, a low pressure sensor to sense pressure of the refrigerant introduced into the compressor, a bypass pipe to connect a first refrigerant pipe disposed between the indoor heat and outdoor heat exchanging units with a second refrigerant pipe disposed in an influx part of the compressor, and a bypass valve to open and close the bypass pipe. The air condition system includes a controller to open the bypass valve when the pressure sensed by the low pressure sensor is a predetermined target low pressure or below, and to close the bypass valve when the pressure sensed by the high pressure sensor is over a predetermined target high pressure, under a condition in which the outdoor temperature sensed by the outdoor temperature sensor is a predetermined reference temperature or below during a heating operation.

According to an aspect of the present invention, the bypass valve includes a first bypass valve and a second bypass valve different from each other in capacity, and the controller opens the first and second bypass valves in an order of a largest capacity therebetween, when the bypass valve is opened.

According to an aspect of the present invention, the controller closes the first and second bypass valves in an order of a smallest capacity therebetween, when the bypass valve is closed.

According to an aspect of the present invention, the bypass valve includes at least one of a solenoid valve and an electronic expansion valve.

According to an aspect of the present invention, the compressor driver includes a gas heat pump.

The foregoing and/or other aspects of the present invention are also achieved by providing a method of controlling an air conditioning system including an indoor heat exchanging unit, an outdoor heat exchanging unit, a compressor forming a closed loop together with the indoor and outdoor heat exchanging units, to compress a refrigerant, a compressor driver to drive the compressor, a bypass pipe to connect a refrigerant pipe disposed between the indoor heat and outdoor heat exchanging units with the refrigerant pipe disposed in an influx part of the compressor, and a bypass valve to open and to close the bypass pipe. The method includes sensing outdoor temperature, sensing the pressure of the refrigerant introduced into the compressor, and opening the bypass valve when the sensed pressure is a predetermined target low pressure or below under a condition in which the sensed outdoor temperature is a predetermined reference temperature or below during a heating operation. The method also includes sensing the pressure of the refrigerant discharged from the compressor, and closing the bypass valve when the sensed pressure is over a predetermined target high pressure under a condition in which the bypass valve is opened.

According to an aspect of the present invention, the bypass valve includes a first bypass valve and a second bypass valve different from each other in capacity. An opening of the bypass valve includes opening a larger capacity one of the first and second bypass valves, and opening the other one after the larger capacity one of the first and second bypass valves is opened.

According to an aspect of the present invention, a closing of the bypass valve includes closing a smaller capacity one of the first and second bypass valves, and closing the other one after the smaller capacity one of the first and second bypass valves is closed.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
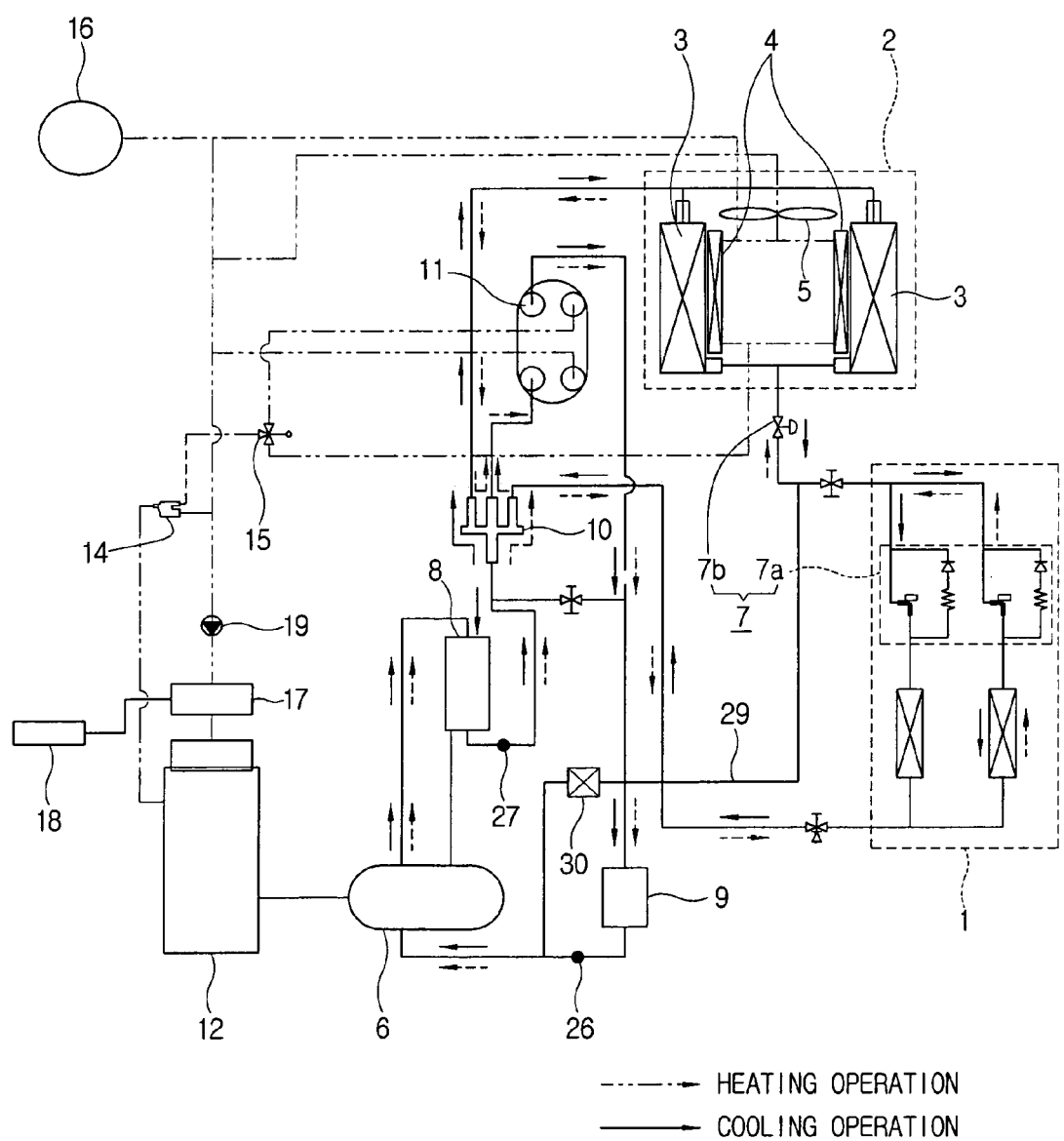
FIG. 1 illustrates a configuration of an air conditioning system, according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIG. 1, an air conditioning system according to an embodiment of the present invention includes a compressor 6, an outdoor heat exchanging unit 2, a refrigerant expansion unit 7, and an indoor heat exchanging unit 1, which are connected by a refrigerant pipe in sequence, forming a closed loop. Here, the refrigerant pipe connected between an efflux part of the compressor 6 and the refrigerant expansion unit 7 is a high pressure pipe to guide a high pressure refrigerant discharged from the compressor 6. The refrigerant pipe connected between the refrigerant expansion unit 7 and an influx part of the compressor 6 is a low pressure pipe to guide a low pressure refrigerant expanded by the refrigerant expansion unit 7.

The low-pressure pipe and the high-pressure pipe are connected to cross each other by a four directional valve 10. The four directional valve 10 switches a flow of the refrigerant, allowing the air conditioning system to perform cooling and heating selectively.

During a heating operation, the refrigerant flows along a broken line arrow (refer to FIG. 1) via the compressor 6, the four directional valve 10, the indoor heat exchanging unit 1, the refrigerant expansion unit 7, the outdoor heat exchanging unit 2, the four directional valve 10 and the compressor 6, in sequence. Thus, during the heating operation, the high pressure pipe is the refrigerant pipe connecting the efflux part of the compressor 6, the four directional valve 10, the indoor heat exchanging unit 1 and the refrigerant expansion unit 7. The low pressure pipe is the refrigerant pipe connecting the refrigerant expansion unit 7, the outdoor heat exchanging unit 2, the four directional valve 10 and the influx part of the compressor 6.

During a cooling operation, the refrigerant flows along a solid line arrow (refer to FIG. 1) via the compressor 6, the four directional valve 10, the outdoor heat exchanging unit 2, the refrigerant expansion unit 7, the indoor heat exchanging unit 1, the four directional valve 10 and the compressor 6, in sequence. Thus, during the cooling operation, the high pressure pipe is the refrigerant pipe connecting the efflux part of the compressor 6, the four directional valve 10, the outdoor heat exchanging unit 2 and the refrigerant expansion unit 7. The low pressure pipe is the refrigerant pipe connecting the refrigerant expansion unit 7, the indoor heat exchanging unit 1, the four directional valve 10 and the influx part of the compressor 6.

An oil separator 8 is provided on the high-pressure pipe between the efflux part of the compressor 6 and the four directional valve 10. The oil separator 8 filtrates oil contained in the refrigerant discharged from the compressor 6, and returns the filtrated refrigerant to the compressor 6. The oil lubricates while the compressor 6 operates.

The outdoor heat exchanging unit 2 is externally placed, and includes an outdoor heat exchanger 3 to circulate the refrigerant, a cooling water heat radiator 4 to circulate the cooling water of a compressor driver 12, and a blowing fan 5 to blow air to the outdoor heat exchanger 3 and the cooling water heat radiator 4.

The indoor heat-exchanging unit 1 is placed in a room to be cooled or heated, and exchanges heat with air of the room cooling or heating the room.

An accumulator 9 is provided on the low pressure pipe at the influx part of the compressor 6. The accumulator 9 prevents the liquid refrigerant from flowing into the compressor 6.

The refrigerant expansion unit 7 includes an indoor expansion valve 7a provided in the indoor heat exchanging unit 7, and an outdoor expansion valve 7b provided adjacent to the outdoor heat exchanging unit 2. The indoor expansion valve 7a expands the refrigerant flowing from the outdoor heat-exchanging unit 2 to the indoor heat-exchanging unit 1 during the cooling operation. The outdoor expansion valve 7a expands the refrigerant flowing from the indoor heat-exchanging unit 1 to the outdoor heat-exchanging unit 2 during the heating operation.

The air conditioning system includes the compressor driver 12 to drive the compressor 6. The air conditioning system employs a gas engine-driven heat pump (GHP) as the compressor driver 12, by way of example. The GHP uses a gas engine driven with gas. Waste heat generated from the gas engine while the compressor driver 12 is operated, is transferred to the cooling water circulating along a cooling water pipe.

The air conditioning system also includes a cooling water circulating system to remove or exploit the waste heat generated from the gas engine while the compressor driver 12 is operated. The cooling water circulating system includes the cooling water pipe forming a closed loop, and a cooling water pump 19 to induce the cooling water to flow. The cooling water flowing along the cooling water pipe by the cooling water pump 19 absorbs the waste heat generated from the compressor driver 12, cooling the compressor driver 12. Then, the cooling water absorbing the waste heat of the compressor driver 12 is heated.

The cooling water after cooling the compressor driver 12, that is, the cooling water heated by the waste heat of the gas engine, is controlled by a thermostat 14 to return to the compressor driver 12 or flow toward a cooling water valve 15. The thermostat 14 controls the cooling water to return to the compressor driver 12 when the heated cooling water has a predetermined temperature or is below the predetermined temperature. The thermostat 14 controls the cooling water to flow to the cooling water valve 15 when the heated cooling water has a temperature that is more than the predetermined temperature.

The cooling water valve 15 is opened and closed by a controller 28 (refer to FIG. 2), allowing the cooling water to selectively flow from the thermostat 14 toward one of a refrigerant heating part 11 and the outdoor heat exchanging unit 2. Hereinafter, a circulation path of the cooling water flowing toward the outdoor heat exchanging unit 2 will be called an outdoor heat exchanging circulation path. A circulation path of the cooling water flowing toward the refrigerant heating part 11 will be called a refrigerant heating circulation path.

The controller 28 controls the cooling water valve 15 to make the cooling water flow from the thermostat 14 to the refrigerant heating part 11 along the refrigerant heating circulation path during the heating operation. The controller 28 also controls the cooling water valve 15 to make the cooling water flow from the thermostat 14 to the cooling water heat radiator 4 of the outdoor heat exchanging unit 2 along the outdoor heat exchanging circulation path during the cooling operation.

Figure 2:
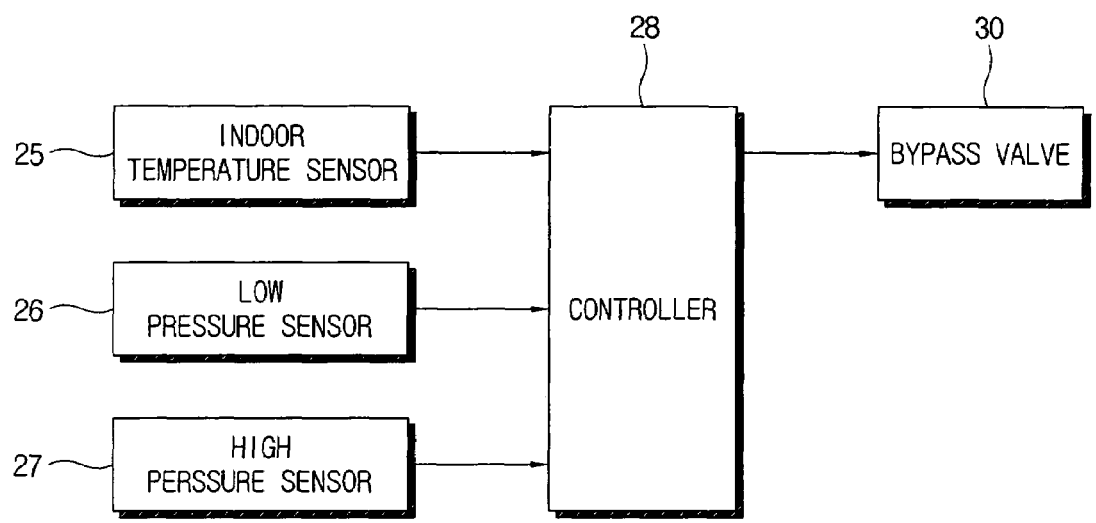
FIG. 2 is a control block diagram of the air conditioning system, according to an embodiment of the present invention.

As shown in FIG. 1, the air conditioning system includes a cooling water tank 16, a discharging gas heat exchanging unit 17, and a discharging muffler 18. As shown in FIGS. 1 and 2, the air conditioning system also includes an outdoor temperature sensor 25, a high pressure sensor 27, a low pressure sensor 26, a bypass pipe 29, a bypass valve 30, and the controller 28.

The outdoor temperature sensor 25 is placed in an outside of the air conditioning system, that is, in the outside of a room to be cooled or heated by the air conditioning system. The outdoor temperature sensor 25 senses an outdoor temperature, and transmits information about the sensed outdoor temperature to the controller 28.

The high pressure sensor 27 senses the pressure of the refrigerant discharged from the compressor 6. That is, the high pressure sensor 27 is installed on the high pressure pipe adjacent to the efflux part of the compressor 6, and senses the pressure of the refrigerant flowing in the high pressure pipe, transmitting information about the sensed pressure to the controller 28. Referring to FIG. 1, the high pressure sensor 27 is installed between the oil separator 8 and the four directional valve 10.

The low pressure sensor 26 senses the pressure of the refrigerant introduced into the compressor 6. That is, the low pressure sensor 26 is installed on the low pressure pipe adjacent to the influx part of the compressor 6, and senses the pressure of the refrigerant flowing in the low pressure pipe, transmitting information about the sensed pressure to the controller 28. Referring to FIG. 1, the low pressure sensor 26 is installed between the compressor 6 and the accumulator 9.

The bypass pipe 29 connects the refrigerant pipe disposed between the outdoor heat exchanging unit 2 and the indoor heat exchanging unit 1 with the refrigerant pipe disposed in the influx part of the compressor 6. Referring to FIG. 1, the bypass pipe 29 has a first end connected to the refrigerant pipe disposed between the outdoor expansion valve 7b adjacent to the outdoor heat exchanging unit 2 and the indoor expansion valve 7a of the indoor heat exchanging unit 1. The bypass pipe 29 has a second end connected to the refrigerant pipe disposed between the compressor 6 and the accumulator 9.

The bypass valve 30 is provided on the bypass pipe 29 and opens/closes the bypass pipe 29 according to control of the controller 28. The bypass valve 30 includes a first bypass valve and a second bypass valve, which are different from each other in capacity.

In the case where the bypass valve 30 is opened, the controller 28 first opens the larger capacity one of the first and second bypass valves, and then opens the other one. In the case where the bypass valve 30 is closed, the controller 28 first closes the smaller capacity one of the first and second bypass valves, and then closes the other one.

The bypass valve 30 also includes at least one of a solenoid valve and an electronic expansion valve (EEV). For example, the solenoid valve may be used as the first bypass valve, and the electronic expansion valve may be used as the second bypass valve. Also, two solenoid valves having different capacities from each other may be provided as the first and second bypass valves. Alternatively, the bypass valve 30 may include a single solenoid valve or a single electronic expansion valve.

The controller 28 opens the bypass valve 30 during the heating operation when the pressure sensed by the low pressure sensor 26 is below a predetermined target low pressure under a condition in which the outdoor temperature sensed by the outdoor temperature sensor 25 is below a predetermined reference temperature. Thus, during the heating operation, some of the high pressure refrigerant flowing from the indoor heat exchanging unit 1 to the outdoor heat exchanging unit 2 is bypassed through the bypass pipe 29 and introduced into the influx part of the compressor 6.

When the refrigerant bypassed and introduced into the influx part of the compressor 6 flows in the compressor 6, a compressing rate of the compressor 6 is increased, so that the circulating amount of the refrigerant in the air conditioning system is increased. Thus, the heating effect of the air conditioning system is enhanced.

When the bypass valve 30 is opened and the high pressure refrigerant is introduced into the influx part of the compressor 6, the pressure sensed by the low pressure sensor 26 and the high pressure sensor 27 is increased. At this time, the controller 28 closes the bypass valve 30 when the pressure sensed by the high pressure sensor 27 is beyond a predetermined target high pressure. Thus, the high pressure pipe is prevented from being increased in pressure.

Figure 3:
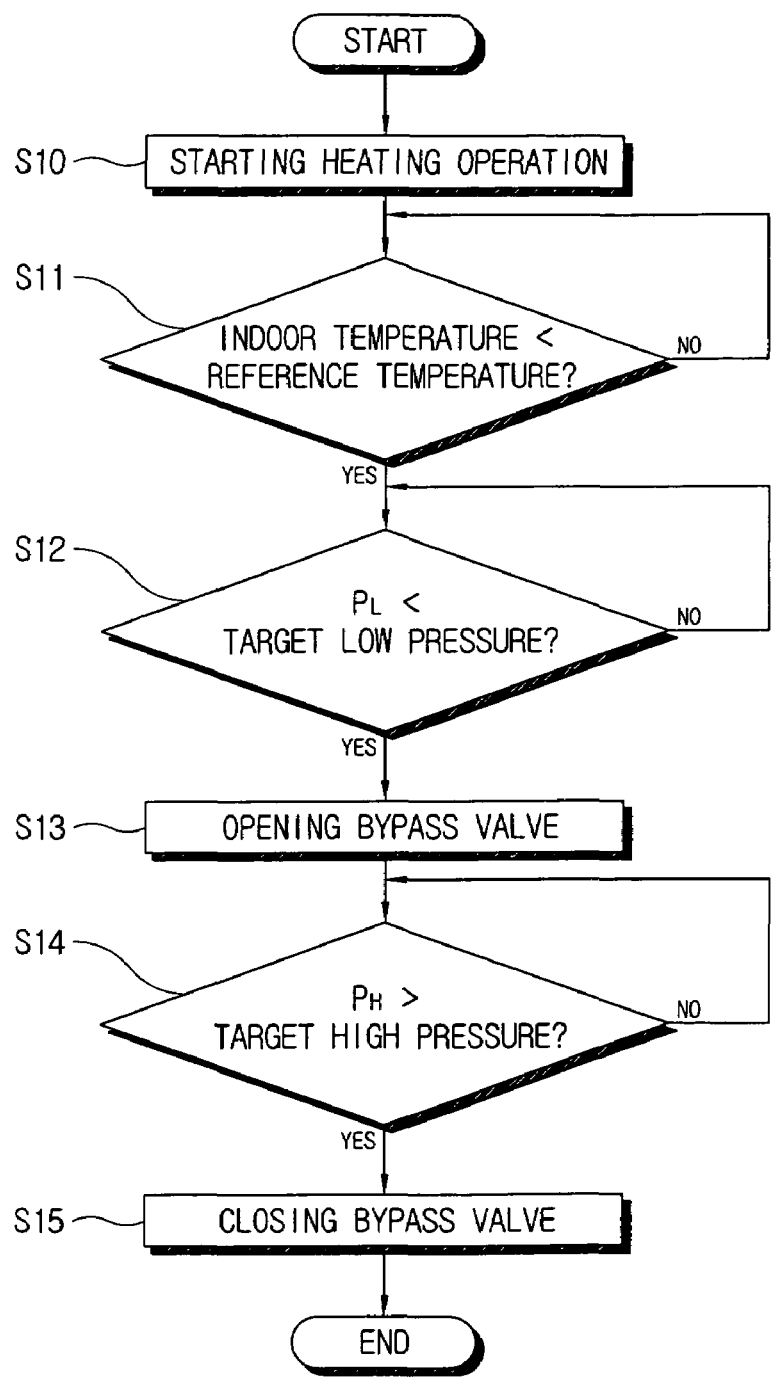
FIG. 3 is a control flowchart of the air conditioning system, according to an embodiment of the present invention.

Operations of the air conditioning system will be described hereinbelow with reference to FIG. 3.

At operation S10, when the heating operation is started, the air conditioning system performs a general heating operation as described above. The outdoor temperature sensor 25 senses the outdoor temperature, and transmits the information about the sensed outdoor temperature to the controller 28.

At operation S11, the controller 28 determines whether the sensed outdoor temperature is a predetermined reference temperature or is below the predetermined reference temperature on the basis of the information about the outdoor temperature transmitted from the outdoor temperature sensor 25.

When it is determined that the sensed outdoor temperature is a predetermined reference temperature or is below the predetermined reference temperature, at operation S12, the controller 28 determines whether the pressure $P_L$ sensed by the low pressure sensor 26 is a predetermined target low pressure or is below the predetermined target low pressure.

When the pressure $P_L$ sensed by the low pressure sensor 26 is a predetermined target low pressure or is below the predetermined target low pressure, at operation S13, the controller 28 opens the bypass valve 30. Thus, some of the high pressure refrigerant flowing from the indoor heat exchanging unit 1 to the outdoor heat exchanging unit 2 during the heating operation is bypassed through the bypass pipe 29 and introduced into the influx part of the compressor 6.

Figure 4:
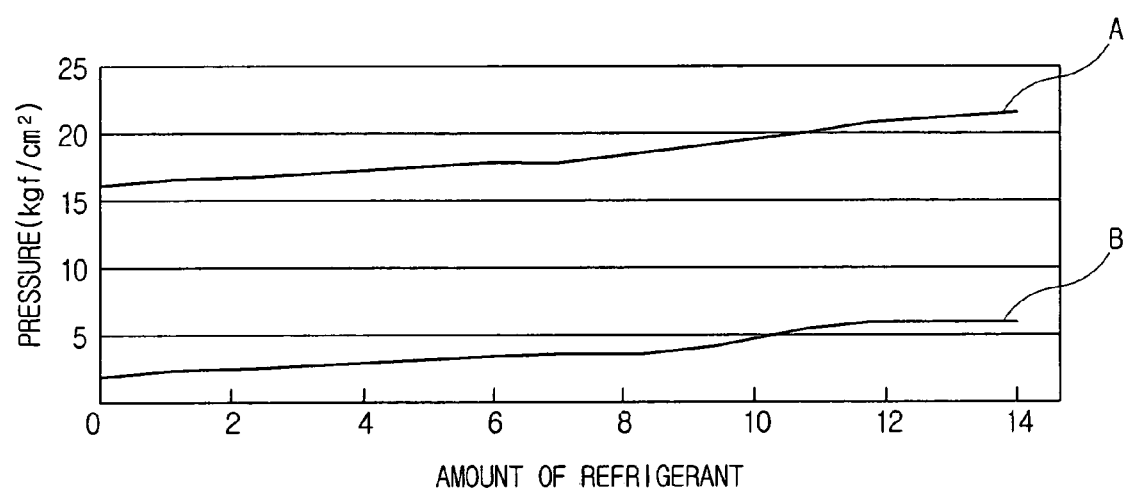
FIGS. 4 and 5 are graphs showing effects of the air conditioning system, according to an embodiment of the present invention.

Then, the high pressure refrigerant bypassed through the bypass pipe 29 and introduced into the influx part of the compressor 6 causes the pressure $P_L$ sensed by the low pressure sensor 26 and the pressure $P_H$ sensed by the high pressure sensor 27 to be increased. FIG. 4 is a graph showing that the pressure $P_L$ sensed by the low pressure sensor 26 and the pressure $P_H$ sensed by the high pressure sensor 27 are changed depending on the amount of the refrigerant bypassed through the bypass pipe 29. In FIG. 4, graph B shows a relation between the amount of the refrigerant and the pressure $P_L$ sensed by the low pressure sensor 26, and graph A shows a relation between the amount of the refrigerant and the pressure $P_H$ sensed by the high pressure sensor 27. The amount of the refrigerant is adjustable by the bypass valve 30.

At operation S14, the controller 28 determines whether the pressure $P_H$ sensed by the high pressure sensor 27 is over a predetermined target high pressure. When the pressure $P_H$ sensed by the high pressure sensor 27 is over a predetermined target high pressure, at operation S15, the controller 28 closes the bypass valve 30. Thus, the general heating operation is performed again.

Figure 5:
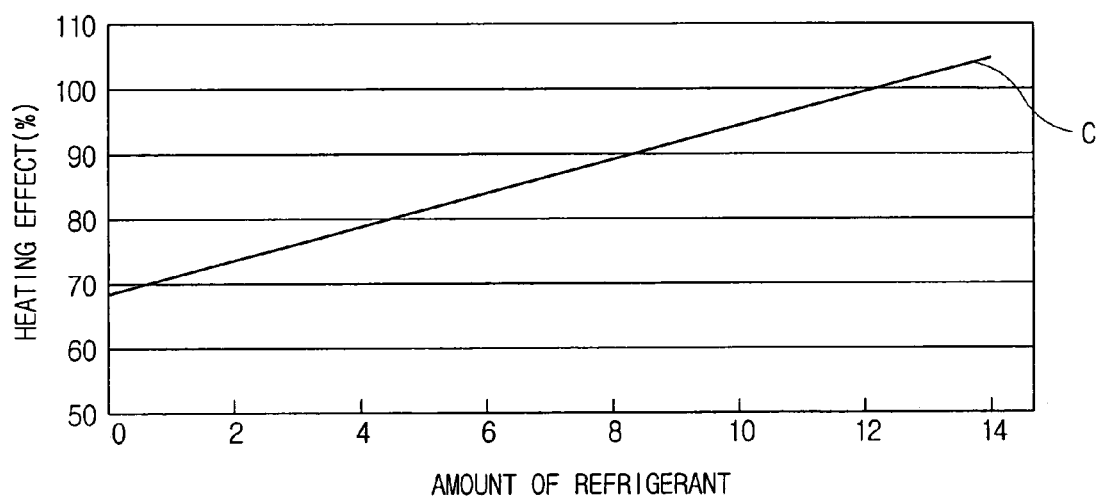

FIG. 5 is a graph showing a relation between the control of the bypass valve 30 and the improvement in the heating effect. As shown in FIG. 5, the heating effect is improved when the bypass pipe 30 is opened, that is, when the amount of the refrigerant bypassed through the bypass pipe 30 is increased as compared with when the bypass valve 30 is closed, that is, when the amount of the refrigerant bypassed through the bypass pipe 29 is 0 (refer to graph C).

According to the above, the bypass pipe 29 and the bypass valve 30 are controlled by the controller 28 and used for improving the heating effect. However, the bypass pipe 29 and the bypass valve 30 may be used for various objects. For example, the bypass pipe and the bypass valve may be used to protect the system and the compressor from heat exchanging efficiency deterioration due to the rapid change of an indoor or outdoor load and strange conditions.

As described above, the air conditioning system includes the outdoor temperature sensor 25 to sense the outdoor temperature, the high pressure sensor 27 to sense the pressure of the refrigerant discharged from the compressor 6, the low pressure sensor 26 to sense the pressure of the refrigerant introduced into the compressor 6, the bypass pipe 29 to connect the refrigerant pipe disposed between the indoor heat exchanging unit 1 and the outdoor heat exchanging unit 2 with the refrigerant pipe disposed in the influx part of the compressor 6, and the bypass valve 30 to open and close the bypass pipe 29. The controller 28 opens the bypass valve 30 when the pressure sensed by the low pressure sensor 26 is a predetermined target low pressure or is below the predetermined target low pressure. The controller 28 closes the bypass valve 30 when the pressure sensed by the high pressure sensor 27 is over a predetermined target high pressure under the condition that the outdoor temperature sensed by the outdoor temperature sensor 25 is a predetermined reference temperature or is below the predetermined reference temperature during the heating operation. Thus, the air conditioning system is improved in the heating effect while performing the heating operation under the condition in which the outdoor temperature is low.

As described above, the present invention provides an air conditioning system and a control method thereof, which is improved in heating efficiency while performing a heating operation under the condition in which an outdoor temperature is low.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An air conditioning system including an indoor heat exchanging unit, an outdoor heat exchanging unit, a compressor forming a closed loop together with the indoor and outdoor heat exchanging units to compress a refrigerant, a compressor driver to drive the compressor, the air conditioning system comprising:
   an outdoor temperature sensor to sense outdoor temperature;
   a high pressure sensor to sense a pressure of the refrigerant discharged from the compressor;
   a low pressure sensor to sense a pressure of the refrigerant introduced into the compressor;
   a bypass pipe to connect a first refrigerant pipe disposed between the indoor heat and outdoor heat exchanging units with a second refrigerant pipe disposed in an influx part of the compressor;
   a bypass valve to open and close the bypass pipe; and
   a controller to open the bypass valve when the pressure sensed by the low pressure sensor is a predetermined target low pressure or is below the predetermined target low pressure, and to close the bypass valve when the pressure sensed by the high pressure sensor is over a predetermined target high pressure, under a condition in which the outdoor temperature sensed by the outdoor temperature sensor is a predetermined reference temperature or is below the predetermined reference temperature during a heating operation.

2. The air conditioning system according to claim 1, wherein the bypass valve comprises:
   a first bypass valve and a second bypass valve different from each other in capacity, wherein the controller opens the first and second bypass valves in an order of a largest capacity therebetween, when the bypass valve is opened.

3. The air conditioning system according to claim 2, wherein the compressor driver comprises a gas heat pump.

4. The air conditioning system according to claim 2, wherein the controller closes the first and second bypass valves in an order of a smallest capacity therebetween, when the bypass valve is closed.

5. The air conditioning system according to claim 4, wherein the compressor driver comprises a gas heat pump.

6. The air conditioning system according to claim 4, wherein the bypass valve comprises:
   at least one of a solenoid valve and an electronic expansion valve.

7. The air conditioning system according to claim 6, wherein the compressor driver comprises a gas heat pump.

8. The air conditioning system according to claim 1, wherein the compressor driver comprises a gas heat pump.

9. The air conditioning system according to claim 1, further comprising:
a cooling water circulating system to remove waste heat generated when the compressor driver is operated, the cooling water circulating system including a cooling water pipe to form a closed loop, and a cooling water pump to induce cooling water to flow.

10. The air conditioning system according to claim 9, wherein the cooling water flowing along the cooling water pipe by the cooling water pump absorbs the waste heat generated from the compressor driver, so that the compressor driver is cooled and cooling water is heated.

11. The air conditioning system according to claim 10, further comprising:
a cooling water valve; and
a thermostat to control the cooling water to return to the compressor driver when the heated cooling water is a predetermined temperature or is below the predetermined temperature, and to control the cooling water to flow to the cooling water valve when the heated cooling water is a temperature that is more than the predetermined temperature.

12. The air conditioning system according to claim 11, wherein the controller controls the cooling water valve to open and close, allowing the cooling water to selectively flow from the thermostat toward one of a refrigerant heating part and the outdoor heat exchanging unit.

13. The air conditioning system according to claim 12, wherein the controller controls the cooling water valve to make the cooling water flow from the thermostat to the refrigerant heating part along a refrigerant heating circulation path during the heating operation, and controls the cooling water valve to make the cooling water flow from the thermostat to a cooling water radiator of the outdoor heat exchanging unit along an outdoor heat exchanging circulation path during a cooling operation.

14. The air conditioning system according to claim 1, wherein the high pressure sensor is installed on a high pressure pipe adjacent to an efflux part of the compressor, and senses the pressure of the refrigerant flowing in the high pressure pipe, transmitting information about the sensed pressure to the controller.

15. The air conditioning system according to claim 1, wherein the low pressure sensor is installed on a low pressure pipe adjacent to an influx part of the compressor, and senses the pressure of the refrigerant flowing in the low pressure pipe, transmitting information about the sensed pressured to the controller.

16. A method of controlling an air conditioning system including an indoor heat exchanging unit, an outdoor heat exchanging unit, a compressor forming a closed loop together with the indoor and outdoor heat exchanging units to compress refrigerant, a compressor driver to drive the compressor, a bypass pipe to connect a refrigerant pipe disposed between the indoor heat and outdoor heat exchanging units with a refrigerant pipe disposed in an influx part of the compressor, a bypass valve to open and close the bypass pipe, the method comprising:
sensing outdoor temperature;
sensing a pressure of the refrigerant introduced into the compressor;
opening the bypass valve when the sensed pressure is a predetermined target low pressure or is below the predetermined target low pressure under a condition in which the sensed outdoor temperature is a predetermined reference temperature or is below the predetermined reference temperature during a heating operation;
sensing a pressure of the refrigerant discharged from the compressor; and
closing the bypass valve when the sensed pressure is over a predetermined target high pressure under a condition in which the bypass valve is opened.

17. The method according to claim 16, wherein the bypass valve comprises a first bypass valve and a second bypass valve different from each other in capacity, and
the opening the bypass valve comprises opening a larger capacity one of the first and second bypass valves, and opening the other one after the larger capacity one of the first and second bypass valves is opened.

18. The method according to claim 17, wherein the closing the bypass valve comprises:
closing a smaller capacity one of the first and second bypass valves; and
closing the other one after the smaller capacity one of the first and second bypass valves is closed.

* * * * *